April 21, 1959  G. E. MALLINCKRODT  2,882,872
ROTARY ENGINE
Filed May 26, 1958  8 Sheets-Sheet 2

George E. Mallinckrodt
Inventor.
Koenig and Pope,
Attorneys.

April 21, 1959 — G. E. MALLINCKRODT — 2,882,872
ROTARY ENGINE
Filed May 26, 1958 — 8 Sheets-Sheet 3

George E. Mallinckrodt,
Inventor
Koenig and Pope,
Attorneys.

April 21, 1959

G. E. MALLINCKRODT 2,882,872

ROTARY ENGINE

Filed May 26, 1958

George E. Mallinckrodt,
Inventor.
Koenig and Pope
Attorneys.

April 21, 1959 G. E. MALLINCKRODT 2,882,872
ROTARY ENGINE
Filed May 26, 1958 8 Sheets-Sheet 5

George E. Mallinckrodt,
Inventor.
Koenig and Pope,
Attorneys.

April 21, 1959

G. E. MALLINCKRODT 2,882,872

ROTARY ENGINE

Filed May 26, 1958

George E. Mallinckrodt, Inventor.
Koenig and Pope, Attorneys.

April 21, 1959 G. E. MALLINCKRODT 2,882,872
ROTARY ENGINE
Filed May 26, 1958 8 Sheets-Sheet 7

George E. Mallinckrodt,
Inventor.
Koenig and Pape,
Attorneys.

April 21, 1959

G. E. MALLINCKRODT 2,882,872

ROTARY ENGINE

Filed May 26, 1958

George E. Mallinckrodt, Inventor
Koenig and Pope, Attorneys.

United States Patent Office 2,882,872
Patented Apr. 21, 1959

2,882,872

ROTARY ENGINE

George E. Mallinckrodt, St. Louis, Mo., assignor to Elliot Enterprises, Incorporated, St. Louis County, Mo., a corporation of Missouri Application May 26, 1958, Serial No. 737,847

22 Claims. (Cl. 123—11)

This invention relates to rotary engines of the type in which several rotating systems (having alternating pistons) interchange angular momentums during certain reverse-locking events, and between which systems certain expansion events cause the systems to overrun one another alternately to supply power to a shaft through power integration means, being an improvement upon the construction shown in my United States patent application, Serial No. 625,978, filed December 3, 1956, for Rotary Engine, eventuated as Patent No. 2,851,998.

Among the several objects of the invention may be noted the provision of means for improving the reliability of the hydraulic action within that part of the apparatus shown in said application for transferring momentum between said rotating systems; the provision of means of the class described adapted to reduce leakage and improve valving operations during certain operating events; and the provision of apparatus of the class described adapted to remove foreign materials including sludge and foam from the hydraulic operating fluid, thereby to provide increased reliability and stability of operation. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated.

The stippling shown in Figs. 1, 2 and 6–9 is arbitrary and for the purpose of diagrammatically distinguishing one connected set of pistons A, B, C, D, L, M and grooves P, Q on rotor 31 from an unstippled set of connected pistons W, X, Y, Z, N, O and grooves R, S on rotor 29. In the diagrammatic Figs. 6–9 the unstippled pistons W, X, Y, Z, N, O and grooves R, S on rotor 29 are dotted as a further distinction. A similar use of stippling and dotting of parts is employed in Figs. 19–21, 23, 24 and 26.

Corresponding reference characters indicate corresponding parts throughout the several views of the drawings.

Figure 1:
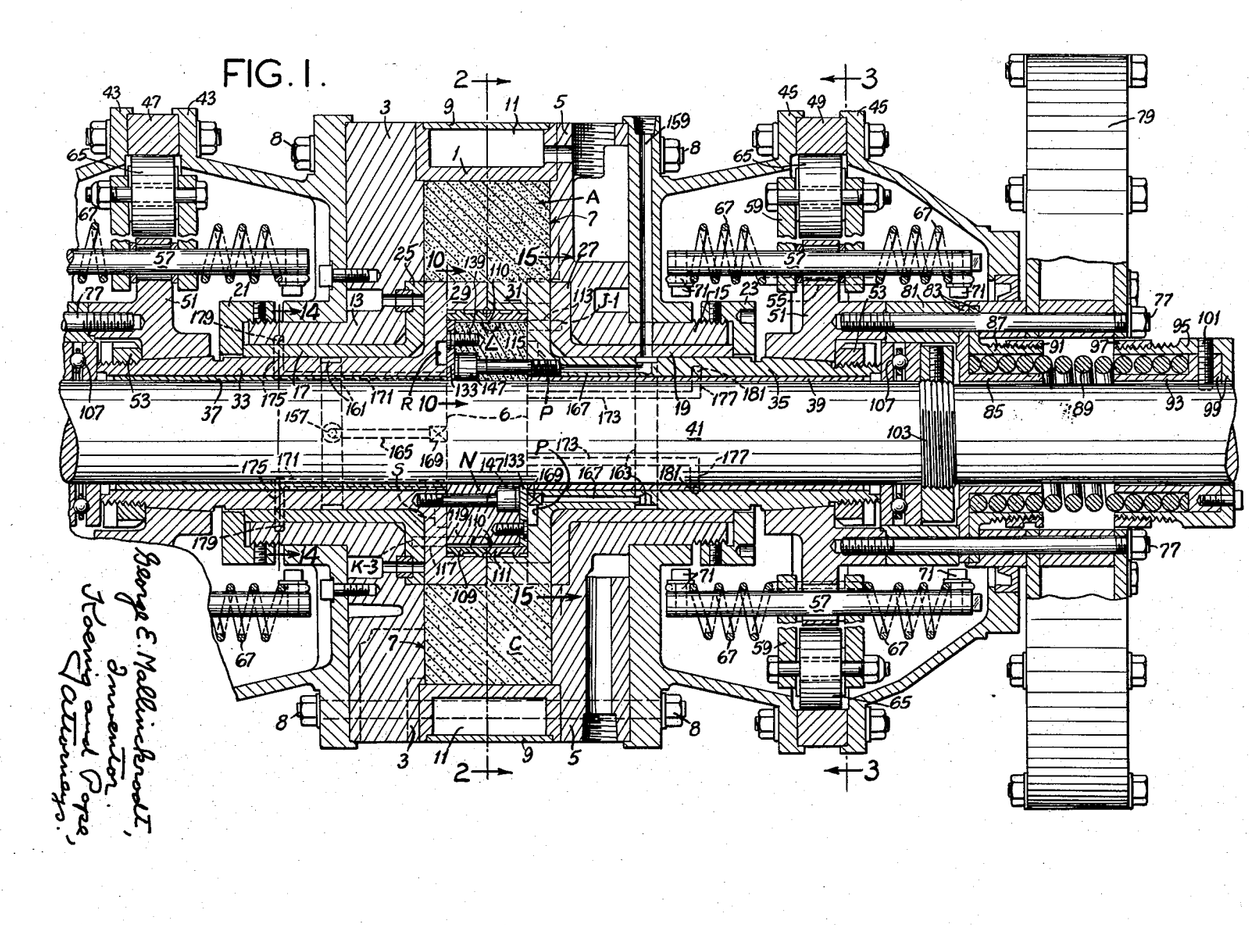
Fig. 1 is a partial longitudinal jogged section of an engine embodying the invention, being taken on line 1—1 of Fig. 2, some of the parts at the left which are the the same as parts shown at the right being omitted.

Referring now more particularly to Fig. 1, there is shown at numeral 1 a stationary ring to which cylinder heads 3 and 5 are attached by means of through bolts 8. Parts 1, 3 and 5 form an annular or toroidal cylinder generally indexed 7. The ring 1 is provided with a jacket 9 to form a water-cooling space 11. The cylinder heads 3 and 5 are formed with necks 13 and 15, respectively, in which are press-fitted, fixed flanged liners 17 and 19, respectively, held in proper axial press-fitted positions by adjusting nuts 21 and 23, respectively threaded to the necks 13 and 15. The flanges of the liners are indexed 25 and 27, respectively, their inside faces being fixed and substantially flush with the inside faces of the cylinder heads 3 and 5.

Located between the flanged portions 25 and 27 are abutting rotors 29 and 31. These have hollow quills 33 and 35, respectively, extending through and out from said liners 17 and 19. Within the quills 33 and 35 are bearing sleeves 37 and 39, on a power shaft 41 extending axially through the machine. These sleeves 37 and 39 form bearings for the rotor quills 33 and 35, respectively.

Figures 2, 6, 10, 12:
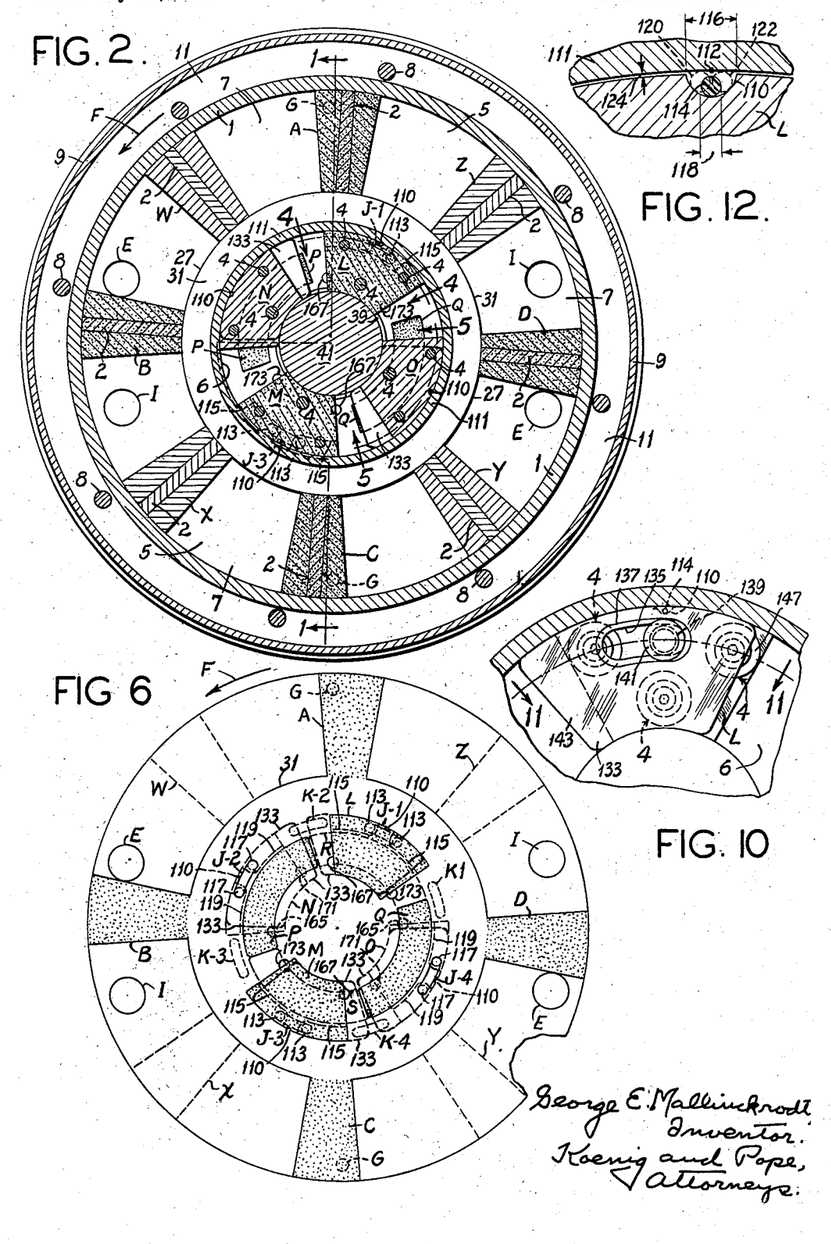
Fig. 2 is a cross section, taken on line 2—2 of Fig. 1, the engine being shown in an intermediate position of parts.
Fig. 6 is a skeleton diagram of parts corresponding to their neutral positions shown in Fig. 2, wherein one rotor is advancing upon the other rotor, the latter being reverse locked.
Fig. 10 is an enlarged cross section taken on line 10—10 of Fig. 1.
Fig. 12 is a further enlarged part of the cross section 2—2 of Fig. 1, illustrating certain sealing means for pistons L, M, N and O.

Carried on the rotor 31 and extending in an axial direction over the outside of the rotor 29 are power pistons A, B, C and D (Fig. 2). Carried on the rotor 29 and extending in an axial direction over the outside of the rotor 31 are power pistons W, X, Y and Z. The power pistons A, B, C, D on rotor 31 interdigitate with the power pistons W, X, Y, Z on rotor 29 and all of them are within the annular cylinder 7. Slide sealing means 2 are employed in each piston, the details of which are of no concern to the essentials of the present invention and they are therefore shown diagrammatically by hatching. Thus power cylinder 7 is formed on the outside by the ring 1, on the ends by the heads 3 and 5, and on the inside by the circular portions of the rotors 29 and 31 that lie just within their pistons.

In the heads 5 are provided inlet ports I and exhaust ports E. Conventional fuel carbureting means such as a carburetor or fuel injector (not shown) is connected with the inlet ports I. Ignition means, countersunk in the head 3, are shown at G, preferably of the continuous, so-called glow-type, having a conventional exciting circuit requiring no electrical timing means. If, as may be, a spark-type ignition is used, then suitable timing will be required in the exciting circuit. The glow-type is employed for purposes of description.

Fastened to the cylinder heads 3 and 5, respectively, are supporting frameworks 43 and 45, supporting inwardly directed cam tracks 47 and 49, respectively. The following description of reverse-locking parts operative with cam track 49 on the right-hand end of the machine (Fig. 1) is identical with the description applicable to the reverse-locking parts operative with cam track 47 on the left-hand end of the machine. The numbering of these parts will therefore be identical and the one description will apply to both sets of such parts. As will be seen from Fig. 1, some of the parts at the left-hand end of the machine are not shown, in order that the scale of Fig. 1 may be as large as possible in the space available; but it will be understood that the parts not shown at the left-hand end of the machine are the same in form and operation as those shown on the right-hand side.

Referring then to the right-hand side of the machine as shown in Fig. 1, quill 35 of the rotor 31 has attached thereto a hub 51. The corresponding hub 51 at the left-hand end of the machine is attached to quill 33 of rotor 29. Lock nuts 53 are used for such purposes. Extending from each hub 51 are lugs 55, in which are rotary pintles 57. Clamped to each pintle 57 is an L-shaped follower link 59, one arm of which (Fig. 3) is split, as shown at 61, and provided with a clamping bolt 63 for clamping each arm fast to its pintle. At the end of the other arm of each follower link 59 is a roller follower 65, engageable with cam track 49. Springs 67 maintain engagement between the follower rollers 65 and the cam track 49. Each spring 67 has a bail 69 engaging its respective lug 55 and anchors 71 on the ends of its respective pintle 57, and is wound with tension in the appropriate direction to effect said engagement.

The cam track 49, for the number (eight) of power pistons shown, is of generally square form, having four flats 73 joined by four corner fillets 75. This arrangement permits free rotation of the respective hub 51 with its lugs 55 in one direction (clockwise in Fig. 3, as shown by the curved dart F). When the parts are in or near the positions shown in Fig. 3, reverse rotation is prevented. This is referred to herein as a reverse-locked position. The reason for the reverse-locking effect is that each compression thrust H is quite close to a perpendicular position relative to its respective flat 73 at a point adjacent its respective fillet 75. This, in view of the tension wound into its respective spring 67, will not allow anticlockwise rotation of the respective follower link 59. It is to be understood that there is a small range of positions near perpendicularity of the vectors H within which range reverse locking can occur. This obviates a harsh impact effect upon reverse locking, resulting in what may be designated a "soft" reverse-locking action, which is conducive to long roller and cam track life. The stated range is measured by only a few degrees.

Figures 3, 7, 11:
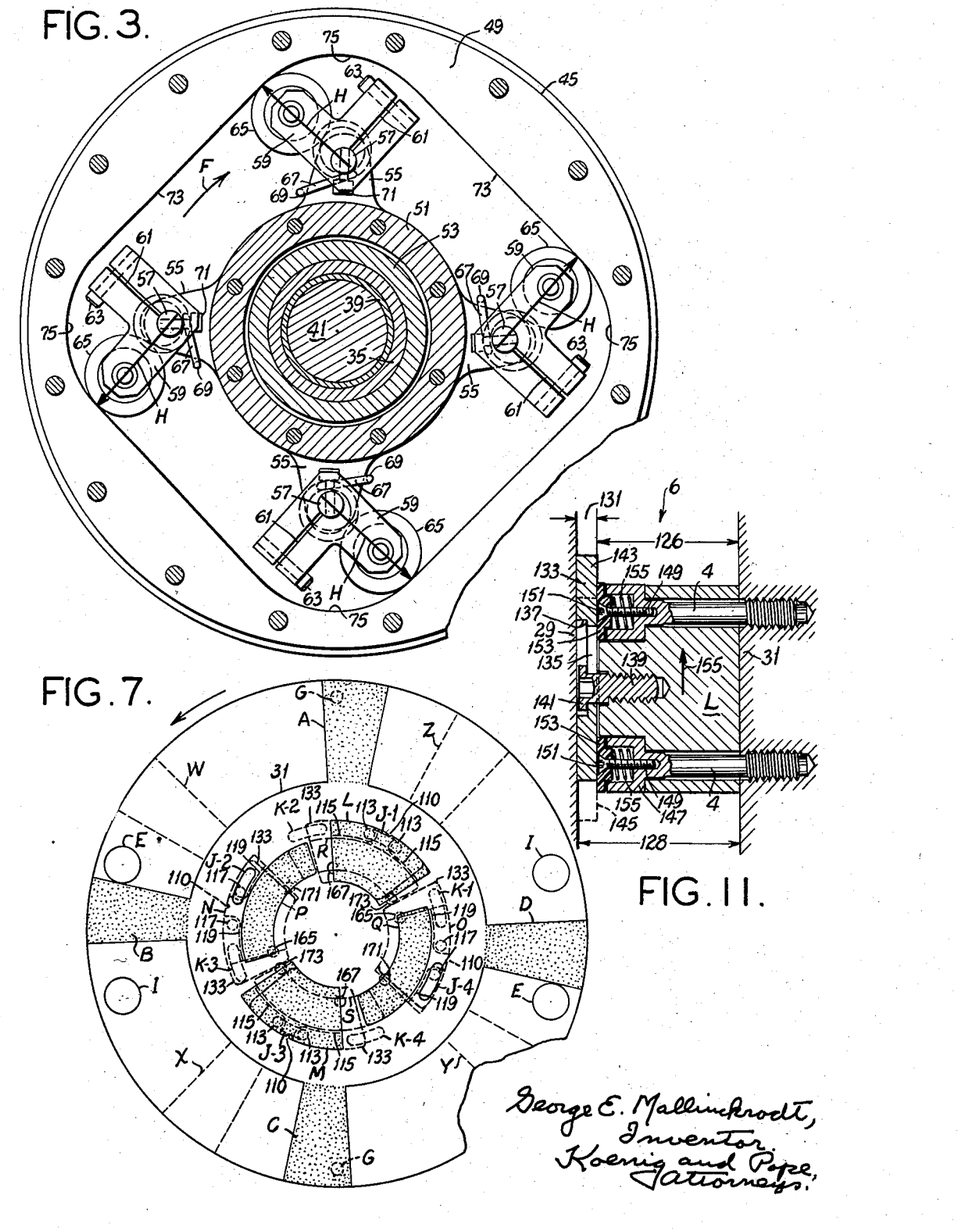
Fig. 3 is a cross section taken on line 3—3 of Fig. 1.
Fig. 7 is a view similar to Fig. 6, showing further advance of the one rotor relative to the reverse-locked rotor.
Fig. 11 is a developed sectional view taken on line 11—11 of Fig. 10.

During clockwise rotation of the respective hub 51 and lugs 55 (Fig. 3), the follower links oscillate in and out around their pintles 57 as the roller followers 65 traverse the cam. It will be understood that, although Fig. 3 shows the reverse-locking cam and follower arrangement on the right-hand end of the machine, the one on the left-hand end involving cam track 47 is the same in form and the cam tracks 47 and 49 are in the same positions relative to the various parts of cylinder 7. Since the respective hubs 51 are attached to the respective quills 35 and 33 of the respective rotors 31 and 29, the rotors, and their attached power pistons (A, B, C, D) and (W, X, Y, Z) respectively have certain reverse-locking positions. The reverse-locking position for rotor 31 is shown in Figs. 2, 6 and 7; that for rotor 29 in Fig. 9. The direction of free rotations for both rotors will accord to downward piston movements at the top of Fig. 1 and upward piston movements at the bottom. This corresponds to clockwise movement in Fig. 3 and anticlockwise movement in Fig. 2. The reverse-locking direction is anticlockwise in Fig. 3 and clockwise in Fig. 2.

Bolted to each hub 51 (see bolts 77) is a spacer ring 81 and a flywheel 79. The bolts also hold the flanges 83 of inner and outer anchoring sleeves 85 and 87 for clamping one end of a helical drive spring 89. The outer sleeve 87 is split and provided with a nut 91. When the nut 91 is run in on the sleeve 87, one end of the spring 89 is gripped. The other end of the spring 89 is anchored between sleeves 93 and 95, the outer one of which is also split for reception of a nut 97 for gripping purposes. The right hand ends 99 of the anchoring sleeves 93 and 95 are pinned to the shaft 41 (see pin 101, for example).

Shaft 41 is threaded, such as shown at 103, for the reception of a nut 105 which forms a shoulder spaced from the end of the respective quill (35 in this case). In the space is located an end thrust bearing 107. The flywheel and spring driving apparatus just described are duplicated at the left-hand end of the machine, although only partly shown in Fig. 1. Thus rotor 31 is connected at the right to shaft 41 through one spring 89 shown in Fig. 1, and is connected at the left to shaft 41 through another spring 89 which does not appear in Fig. 1, but is identical to the spring 89 and its connections as shown and described.

Reverting to the central portion of the machine near section line 2—2 of Fig. 1, and to Fig. 2, numerals 109 and 111 indicate liner rings attached within the rotors 29 and 31, respectively. As shown in Fig. 1, the abutting ends of the rotors 29 and 31 are cup-shaped and together form a circular cavity within the liners. This cavity surrounds the shaft 41 and is generally indexed 6. In this cavity 6 are four control pistons, two of which (indexed L, M) are bolted to the bottom of the cavity part in rotor 31 carrying power pistons A, B, C, D, and the other two of which (indexed N, O) are bolted to the bottom of the cavity part in rotor 29 carrying power pistons, W, X, Y, Z. The bolts for fastening these are indexed 4, three being used for fastening each piston (see Figs. 10 and 11). It will be noted that only one control piston L on rotor 31 and one control piston N on rotor 29 appear in Fig. 1 (see jogged section line 1—1 on Fig. 2), whereas all of the control pistons L, M, N, O appear in Fig. 2 (see section line 2—2 on Fig. 1).

One improvement constituting part of the present invention relates to the fact that the margins of the pistons L, M, N, O are provided with running seals within the liner rings 109 and 111. These are arranged in the manner illustrated in Fig. 12, which shows a seal for one piston L and one liner ring 111. The sealing means for all of the pistons L, M, N, O being the same, the description of one will be sufficient. Each sealing means is constituted by a slot 110 across the outer piston face. This slot is preferably circular in cross section and, for example, .125" in diameter, as illustrated at 116. The circular cross section has a virtual center line 112 in or near the inner faces of the rings 109 and 111. Cradled axially in the trough of the slot is a small cylinder, roller or stem 114 composed of a suitable partially resilient material such as Teflon, nylon or the like. The length of the roller is such that it extends from one end face to the other of the respective piston. The diameter of each stem 114 is smaller than the diameter of the slot 110, being for example .054", as illustrated at 118. Thus the smaller sealing stem 114 may roll back and forth in the larger slot 110, as illustrated by the dotted-line alternate positions shown. In so rolling, it is directed outward by the cam-forming larger slot 110 and into engagement with the inner surfaces of the liners 109 and 111, the latter only being shown in Fig. 12. The advantage of this sealing arrangement is its simplicity and reliability. Thus when leakage tends to be from right to left in Fig. 12, the sealing cylinder 114 tends to roll up into the dotted-line position 120 to effect a seal, and when the leakage is from left to right it tends to roll up into the dotted-line position 122, again to effect a seal. This action is enhanced by centrifugal force operative upon the cylinders 114. Thus the running gap 124 outside of each piston is substantially sealed against leakage in either direction, as required, with the provision of a more or less free-running condition during periods of small or no tendency to leakage.

Figures 4, 8:
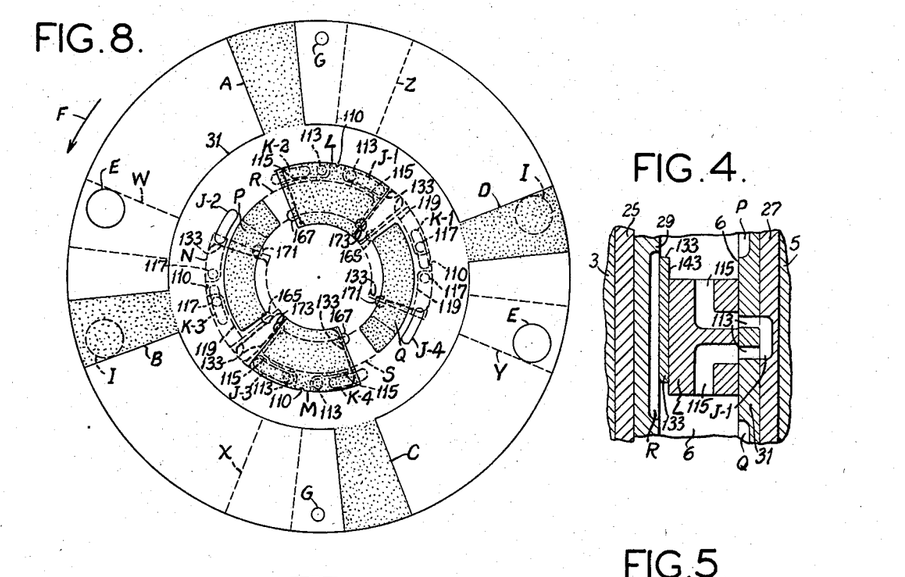
Fig. 4 is a developed view of section 4—4 of Fig. 2.
Fig. 8 is a view similar to Fig. 7 but showing further advance of the one rotor and retreat of the other from reverse-locked position.
Figures 5, 9:
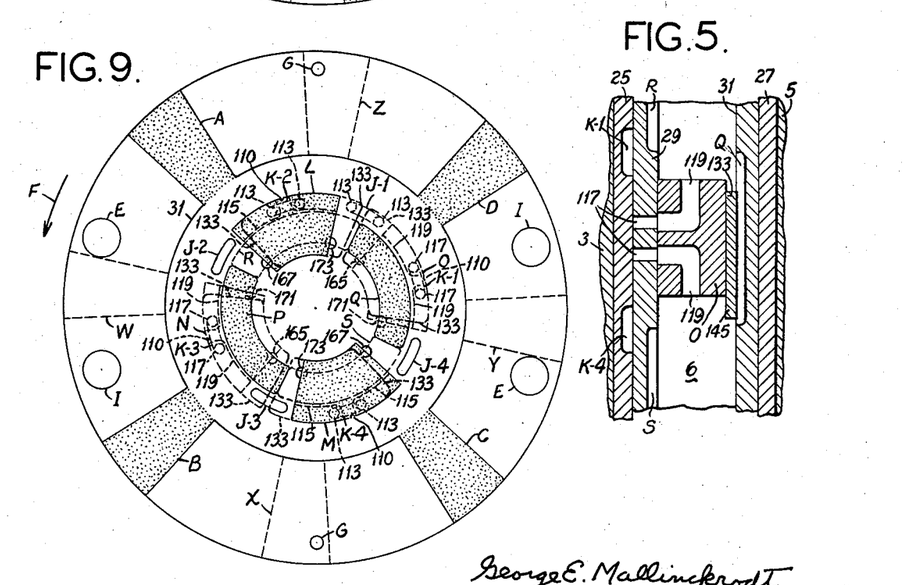
Fig. 5 is a developed view of section 5—5 of Fig. 2.
Fig. 9 is a view of a position of parts similar to Fig. 6, except that the rotor positions have been interchanged.

All of the sector-shaped pistons L, M, N, O have axial lengths 126 from their respective anchored supports on the rotors 29 and 31 less than the axial width of the distance 128 between the inner faces of the rotors within cavity 6, as illustrated in Fig. 11. This shows piston L attached to rotor 31 by bolts 4, for example. This leaves distance such as 131 at the outer end of each piston. The sealing stems are of lengths equal to the distance 126. Into the space indicated by the distance 131 is interfitted a sector-shaped valve or port control means 133, preferably made of ferrous material. It will be appreciated that the space 131 associated with pistons L and M (as shown in Figs. 4 and 11) is on the left as viewed in Fig. 1, and the space 131 associated with the pistons N and O is on the right (Fig. 5). The sides of the sector shape of these valves subtend angles somewhat greater than the angles subtended by the sides of the sector-shaped pistons L, M, N, O. Each valve 133 is provided with a centray symmetrically located arcuate slot 135, having a marginal shelf 137. A central stud 139 in the end of the corresponding piston passes through the slot 135 and has a head 141 above the shelf 137. Thus each valve 133 may move freely and angularly with respect to its related piston, the movement being from a central position to either one of two lateral positions. Nevertheless, each valve is held captive (with lost motion) on its respective piston. One extending position is illustrated in Figs. 4, 10 and 11, wherein the resulting overlap is indexed 143. It is clear from Fig. 10 that the valves 133 could also assume a rightwardly extending position with respect to the piston, in which event there would be a right-hand overlap, as illustrated by dotted lines 145 in Fig. 11.

Each bolt 4 is provided with an enlarged hollow head 147 in which is threaded a central post 149, having a distance-limiting head 151. Around each post is located a slidable Teflon or nylon disc 153, outward motion of which is limited by the respective head 151. An internal compression spring 155 biases each disc outward into an outward position as limited by the respective head 151. Thus each disc 153 is caused to press upon the piston side of the valve 133, so as to press it against the opposite wall of the space 128. The coefficient of friction between the Teflon or nylon heads 153 and the metal of which the valve 133 is composed (preferably steel) is less than the coefficient of friction between the opposite ferrous face of the valve 133 and the opposing ferrous face of the space 128.

Complete action of the operation of the valves 133 will be described below. It will suffice at this point to note that upon acceleration of a piston in a given direction the respective valve 133 may by its inertia take up a lagging position relative to the piston movement with its lapped portion trailing the piston. On the other hand, when the piston decelerates in the same direction, the valve may take up a leading position with its lapped portion ahead of the piston. Thus in Fig. 11, if the piston L decelerates in a direction shown by the dart 155, the valve will tend to take up the solid-line position with leading lap 143. This is normally due to the inertia of valve 133. It is also due under certain circumstances to certain compression events between pistons L, M, N, O to be described below. If the piston accelerates in this direction, the valve 133 will tend to take a lagging position, as shown by the dotted lines, with lagging lap 145 due to the relatively small friction between the plastic discs 153 and the valve 133 as compared to the greater friction between the ferrous surfaces between the rotor (such as 29) and the valve 133.

In the bottom of the cavity within the end of rotor 31 not occupied by the pistons L, M are symmetrically located sector-shaped grooves P, Q (Figs. 2, 4 and 6-9). The bottoms of these are stippled where exposed, to emphasize that they rotate with stippled pistons A, B, C, D, L and M. In the bottom of the cavity within the end of rotor 29 not occupied by pistons N and O are symmetrically located sector-shaped grooves R, S. These grooves R, S are not stippled but are shown by dotted lines in Figs. 6-9 to indicate that they rotate with pistons W, X, Y, Z, N and O. These also appear in Fig. 5 in solid lines. The grooves P and Q show in Fig. 2, but the grooves R and S, being above the plane of this latter section, do not appear. None of the grooves R, S; P or Q appear in solid lines in the Fig. 1 axial section, but dotted representations of P and R have been rotated into the plane of this section for clarifying their radial positions.

As above described, the flanges 25 and 27 of liners 17 and 19 are affixed to the cylinder heads 3 and 5 and are therefore stationary. In flange 27 are located four short arcuate grooves J-1, J-2, J-3 and J-4 (see Figs. 2, 4 and 6-9). These (as indicated in Fig. 4) become connected at certain times with the inside of the cavity by means of holes 113, drilled through the radial part of the rotor 31 that forms one end of the cavity 6. The holes 113 connect permanently respectively with passages 115 in the pistons L and M, which are bolted to the rotor 31. The members of each pair of passages 115 respectively extend to the opposite face of the piston L or M, as the case may be. For convenience in manufacture, passages 115 are right-angular grooves cut into the outer peripheries of the pistons.

In the other flange 25 are located four short arcuate grooves K-1, K-2, K-3 and K-4 (see Figs. 5-9). These, as shown in Fig. 5, are connected at certain times with the inside of the cavity 6 by means of holes 117, drilled through the radial part of the rotor 29 that forms the other end of the cavity. The holes 117 respectively connect permanently with passages 119 in the control pistons N and O, which are bolted to the rotor 29. The members of each pair of passages 119 respectively extend to the opposite face of the piston N or O, as the case may be. For manufacturing convenience, these passages 119 are also right-angular grooves cut into the outer peripheries of the pistons.

In Fig. 1, groove J-1, one hole 113 and one passage 115 have been rotated into the plane of the Fig. 1 section and shown in dotted lines. Also in Fig. 1, groove K-1, one hole 117 and one passage 119 have been rotated into the plane of the Fig. 1 section and shown in dotted lines.

This is for the purpose of showing the relative axial positions of these parts. Figs. 2 and 6–9 will show their relative angular positions in connection with the description to be given. The developed views of Figs. 4 and 5 are illustrative details of them.

Referring to Figs. 2–9, operation is as follows, keeping in mind that the rotary directional dart F of Fig. 3 will appear in the reverse direction as shown in Figs. 2 and 6–9:

Starting with the parts as shown in Figs. 2 and 6 (the latter being diagrammatic), the rotor 31 carrying pistons A, B, C, D, L, M is taken to be in reverse-locked position (see the reverse-locked position of the followers 59, 65 on the cam track 49 in Fig. 3). An expansion (explosion) event is occurring both between pistons A and W and between pistons C and Y. An exhaust event is occurring both between pistons W and B and between pistons Y and D. A suction or fuel injection event is occurring both between pistons B and X and between pistons D and Z. A compression event is occurring both between pistons Z and A and between pistons X and C. The control pistons L, M on rotor 31 are in symmetrical bisecting positions over the respective grooves R and S in rotor 29 (Fig. 6), their valves 133 having theretofore been moved forward during deceleration of rotor 31 so as substantially to block off these grooves R and S. The control pistons N and O on rotor 29 are in symmetrical bisecting positions over the respective grooves P and Q in rotor 31, their valves 133 having theretofore been moved backward during acceleration of rotor 29 substantially to block off these grooves P and Q. The passages 115 of control piston L are stationary and through holes 113 are registered with stationary groove J–1, thereby affording an auxiliary restricted fluid communication from one side to the other of piston L. The passages 115 in stationary control piston M are registered through holes 113 with the stationary groove J–3, forming an auxiliary restricted communication from one side to the other of the piston M. The stationary grooves J–2 and J–4 are not at this time in registry with any other passages. None of the stationary grooves K–1, K–2, K–3, K–4 are in registry with any of the passages 119 in pistons N and O.

Assuming now that the rotor 29 advances anticlockwise from the Fig. 6 to the Fig. 7 position, further gaseous compression (or gaseous collision) occurs between pistons Z and A and between pistons X and C, rotor 31 with its pistons A, B, C, D, L, M being reverse locked under reaction from the expansion occurring between pistons A and W on the one hand, and Y and C on the other hand. During this action, the hydraulic control pistons O and N advance upon stationary control pistons L and M, respectively, thus at first having squeezed hydraulic fluid from front to rear of the pistons O and N, respectively, through the grooves Q and P, respectively, followed by a cutoff action as the valves 133 on pistons N and O move forward during deceleration of rotor 29. Fluid is then forced past pistons L and M via small ports 115, 113, J–1 and 115, 113, J–3, respectively, with increase of throttling of flow. Thus in addition to the gaseous collision process occurring between pistons Z and A and between X and C, there will occur a hydraulic collision process between the control pistons N and M on the one hand, and between O and L on the other hand. Thus the gaseous collision process going on in the power cylinder 7 is assisted by the hydraulic collision process in the control cavity between rotors 29 and 31.

The next step in the process will be seen by comparing Figs. 7 and 8. In proceeding from Fig. 7 to Fig. 8, the rotor 29 continues to move and the sum of the said gaseous collision and hydraulic collision processes causes angular momentum to be transferred from the rotating system connected with rotor 29 to that connected with rotor 31, and ultimately moving the latter from its reverse-locked position. This moves pistons A, B, C, D, L and M as indicated in Fig. 8. The deceleration thus applied to rotor 29 urges the valves 133 on pistons N and O to change from trailing to leading positions (Fig. 7). During the first part of this operation the rotor 29 is decelerating but still overtaking the rotor 31 as the parts first approach the Fig. 8 configuration and while this does not continue for long it is accompanied by a change in the positions of valves 133 on pistons L and M from leading to trailing positions. As the overtaking process proceeds from the Fig. 7 configuration to the Fig. 8 configuration, the passages 115, 113 associated with pistons L and M, respectively, pass out of register with respect to the grooves J–1, J–3, respectively, so that the remaining charge of hydraulic fluid between pistons O and L on the one hand, and between pistons N and M on the other hand, becomes completely trapped. The result is a substantially inelastic connection between the rotors 29 and 31 which carries them together in an anticlockwise direction during the action as depicted in Fig. 8. The two rotor systems then move as one system, with all of the angular momentum that was in the system connected with rotor 29, divided between the systems connected to 29 and 31. The result is that (Fig. 8) both move with the same angular velocity equal to half the maximum velocity of the rotor 29, the moments of inertia of both systems being the same, since their structures are identical.

In the Fig. 8 configuration, the rotor 29 is moving into the range of reverse-locking activity of its reverse-locking elements 59, 65, and ultimately moves up to the reverse-locking position such as shown in Fig. 9. By this time, as shown in Fig. 8, the ignition devices have been exposed to the compressed charges in the clearance spaces between pistons Z and A and X and C, respectively, thus having ignited them for expansion by the time pistons Z and X arrive at their final reverse-locked positions, as shown in Fig. 9. This second expansion event initiates a second cycle.

Thus it will be seen that in Fig. 9 the rotor 29 has moved into reverse-locked position wherein its pistons Z and X cover the ignition devices G, and the expansion event which proceeds between pistons Z and A and between X and C places the rotor 31 in the position that rotor 29 had initially in the Fig. 6 configuration. It will also be noted that the passages 119, 117 associated with control pistons O and N, respectively, have come into registry with the stationary grooves K–1 and K–3, respectively. This has the effect of connecting the spaces on opposite sides of the control pistons O and N on rotor 29 when reverse locked. Also, the control pistons L and M on rotor 31 are in bisecting positions over grooves R and S, with their valves 133 in trailing positions ready for opening of the passages when the pistons L and M advance further from the Fig. 9 position. Thus is broken the temporary inelastic hydraulic connection between rotors which theretofore assured that the overtaking rotor 29 would enter the reverse-locking range in displacing the reverse-locked rotor 31.

The above has described a sequence of events requiring 45° of motion of each of the rotors 29 and 31. This resulted in interchange of the rotor positions (compare Figs. 6 and 9). The machine is then as in Fig. 9.

The operation for the second cycle is similar to that of the operation above given for the first cycle, except that the relations of movements of the power pistons A, B, C, D and W, X, Y, Z are interchanged; likewise, the movements between the control pistons L and M and grooves R and S on the one hand, and the movements between the control pistons O and N and the grooves P and Q on the other hand are interchanged. Nevertheless, the actions on the power events in power cylinder 7 by the control events in the cavity 6 are the same. For example, consider in Fig. 9 that the rotor 31 (pistons A, B, C, D) will advance on rotor 29 (pistons W, X, Y, Z). This advances control piston M toward the stationary control piston O, and at the same time moves the groove Q anticlockwise under the piston O and its valve 133 (now forward). Thus fluid is squeezed from between control pistons M and O into location between piston O and receding piston L. This at first occurs through the groove Q, but gradually the entry end of this groove Q is being throttled as it moves under piston O and valve 133. This gradually shuts off the flow, so as to provide the increasing hydraulic collision assistance to the gaseous collision event occurring between power pistons D and Z. At the time of shut-off of this flow through groove Q, hydraulic flow will occur past control piston O through its passages 119, 117 and registered groove K–1. Ultimately, as rotor 29 again moves, passages 119, 117 in piston O leave groove K–1 and the two rotors 29, 31 move in inelastic hydraulic connection with one another until passages 115, 113 of piston M register with groove J–4, whereupon this connection is broken and rotor 29 released from rotor 31 as the latter again reaches a position within its reverse-locking range.

The cavity 6 is filled with a substantially noncompressible hydraulic fluid lubricant. Such lubricant is subject to contamination, as from wearing of parts and may contain some absorbed gases which may foam and reduce the desired incompressibility. Any increase in compressibility of the hydraulic fluid due to foaming or the like is more or less detrimental because reliable and stable locking conditions between the rotors 29 and 31 depend upon the degree of incompressibility of the hydraulic fluid used.

The following arrangement continuously supplies hydraulic fluid while eliminating contaminants and foam. Referring to Figs. 1, 13, 14 and 15, hydraulic fluid inlet ports 157 and 159 are shown, leading through the stationary parts to grooves 161 and 163 on the rotor quills 33 and 35, respectively. Connections 165 and 167 lead from the grooves 161 and 163, respectively to the cavity 6 through inlet check valves 169. Pressure is maintained on the inlets 157 and 159 by a suitable conventional hydraulic circuit and pump driven from the engine, by suitable means (not shown). Thus a potential supply of hydraulic fluid under pressure is maintained in connection with the cavity 6.

In order to bleed off contaminants and foam, passages 171 are formed in the rotor 29, and like passages 173 are formed in the rotor 31. These connect with the cavity 6. The passages 171 have outlets 175 in the quill 33. The passages 173 have outlets 177 in the quill 35.

In order to time the outlet action of the outlets 175, stationary outlets 179 are established in the stationary parts 13 and 17 at the left-hand end of the machine (Figs. 1 and 14) for registry from time to time with the rotating outlets 175. The registration interval is 180°. Likewise, in order to time the outlet action of the outlets 177, stationary outlets 181 are established in the stationary parts 15 and 19 at the right-hand end of the machine (Figs. 1 and 15) for registry from time to time with the rotating outlets 177. The registration interval is again 180°.

Figures 13, 14, 15:
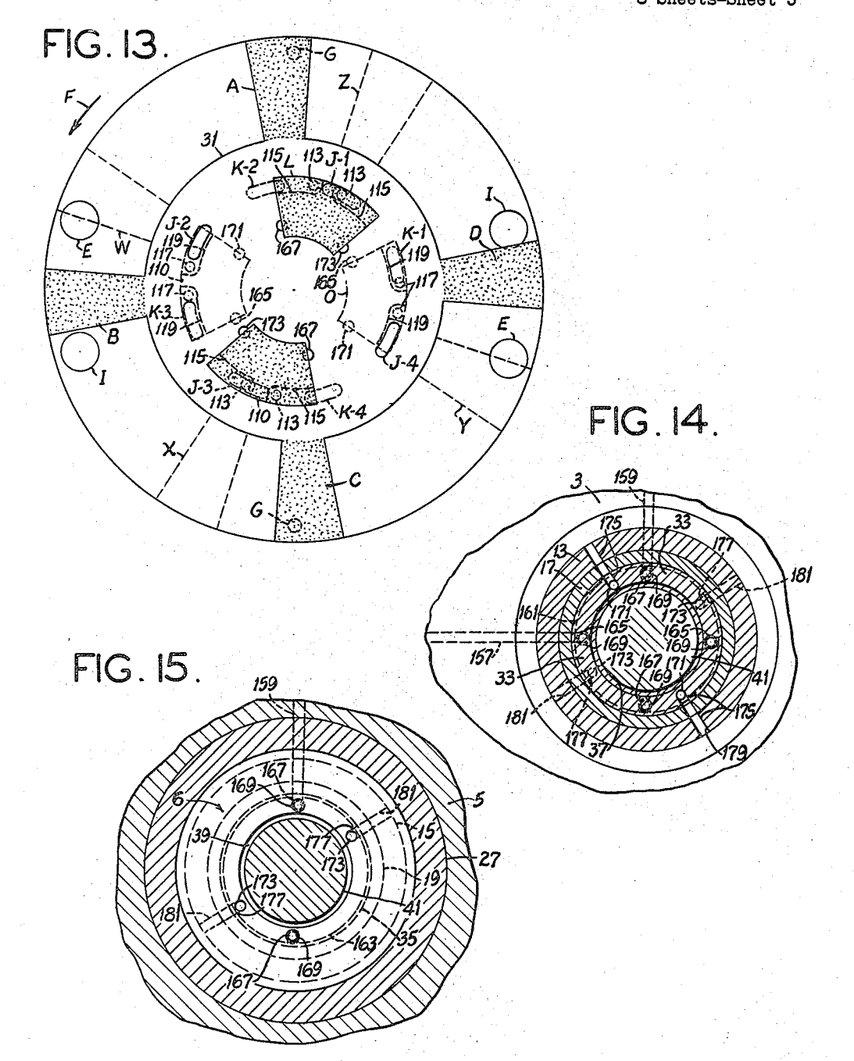
Fig. 13 is a view similar to Figs. 7 and 8 corresponding to a position intermediate thereto and for clarity omitting certain dynamic valves and the ports controlled thereby.
Fig. 14 is a cross section taken on line 14—14 of Fig. 1.
Fig. 15 is a cross section taken on line 15—15 of Fig. 1.

The outlets 179 and 181 are drilled so that for a short interval they are in connection with the outlets 175 and 177, respectively. This occurs in the positions of parts shown in Fig. 13. It will be observed that Fig. 13 exhibits events occurring between the events of Figs. 7 and 8. Thus the sludge and foam releasing event which is illustrated in Fig. 13 occurs for an instant just prior to the time that it is desired that the rotors 29 and 31 move together in hydraulically locked relationship and it is at this time that any sludge is removed, as well as any possible foam which might otherwise "soften" the hydraulic connection between the rotors. Shortly after the Fig. 13 releasing event, the outlets 175 and 177 become unregistered with the release ports 179 and 181, respectively, thus placing the rotors in relatively rigid hydraulic connection with one another to carry them in such relation from the Fig. 13 positions of parts through the Fig. 8 position of parts.

Returning to the action of the slide valves 133 in connection with the respective pistons L, M, N, O, it may be remarked that the valve inertia and differential friction are not alone depended upon for moving each valve 133 from trailing to leading position with respect to a piston L, M, N or O and grooves P, Q, R or S; although these are sufficient under usual operating conditions. For example, if the movement of parts from the Fig. 6 to the Fig. 7 position should not involve a sufficient deceleration of rotor 29 to cause a valve 133 to advance early from the trailing or lagging position shown in Fig. 6 to the leading position shown in Fig. 7, nevertheless closure of the groove Q would ultimately be brought about even though the valve 133 of piston O, for example, is in the lagging position. In such event, the groove J–4 will be closed later, assuming the valve 133 of piston O to be lagging. Upon closure, fluid will be trapped between pistons O and L. If then, due to any insufficient lap between the front end of valve 133 and groove Q, there should be a tendency to leakage from between pistons O and L, permitting them to recede from one another, the result will be an advance of piston M on piston O, thereby compressing fluid between them, which pressure positively forces the then-assumed lagging valve 133 forward to leading position, as shown in Fig. 7. It will therefore be understood that normally the desired leading and lagging actions of the valves 133 will be properly accomplished under the normal dynamic accelerations and decelerations of the rotors, as aided by the differential frictions on opposite sides of each valve 133 as hereinabove described. However, if due to any unusual operating conditions, such as starting, this dynamic and frictional control of the action of valves 133 should not be sufficient, the described positive hydraulic resetting action will occur.

Eight power cycles occur for each revolution of the power shaft. The first, third, fifth and seventh cycles operate by overrunning action of the pistons and porting grooves connected with rotor 29 with respect to the pistons and porting grooves connected with stationary rotor 31; and the second, fourth, sixth and eighth cycles operate with similar results by overrunning action of the pistons and porting grooves connected with rotor 31 with respect to the pistons and porting grooves connected with stationary rotor 29. During the first, third, fifth and seventh cycles, the passages 115, 113 of pistons L and M cooperate with stationary grooves J–1, J–2, J–3 and J–4. During the second, fourth, sixth and eighth cycles, the passages 119, 117 of pistons N and O cooperate with stationary grooves K–1, K–2, K–3 and K–4.

It will be understood that the reverse-locking parts, including 55, 59 and 65, as shown in Fig. 3 for rotor 31, are duplicated on rotor 29 at the other end of the machine, but not shown. In the latter case the reverse-locking parts corresponding to parts 59 and 65 have the same structural relationship to pistons W, X, Y, Z on rotor 29 as the parts 5 and 65 have relative to pistons A, B, C, D on rotor 31.

As each rotor is intermittently driven under an expansion event and moves its follower system 51, 55, 57, 59, 65 along with its flywheel 79, it drives the shaft 41 by winding up its respective connecting spring 89, the other spring 89 connecting the other rotor system with the shaft unwinding. The springs therefore form means whereby alternately energy is delivered from the respective rotors to the common shaft 41 and permit alternate overrunning of one rotor with respect to the other. In effect they integrate energy at the shaft received alternately from the rotors.

It will be understood that while various grooves have been referred to as forming certain passages, slots, cored or drilled holes and the like may be used, and these are therefore to be considered as equivalents. It is also to be noted that the type of rotary engine to which the invention applies is sometimes referred to in the art as an alternating piston engine, meaning that groups of interdigitating power pistons on rotors in a toroidal or annular cylinder move alternately in carrying out thermodynamic cyclic processes. In the same sense, the groups of control pistons L, M and N, O described herein are to be considered as interdigitating in the cavity 6 and being of the alternating type. The term alternating is also used in the sense that the pistons of one rotor alternate in position with respect to the pistons on the other rotor. This is also rue of certain passages such as the grooves P, Q, R, S. In the case of grooves J–1, J–2, J–3, J–4 and K–1, K–2, K–3, K–4, the members of the respective groups alternate in position, peripherally considered.

While the passages 119, 117 (through pistons N and O) and the passages 115, 113 (through pistons L and M) are shown as grooves on the piston peripheries, it will be understood that these may be in the form of drilled or cored passages from one wall to another of the respective pistons. Also, while the grooves P and Q in rotor 31 and the grooves R and S in rotor 29 are shown as open throughout their lengths, it will be understood that these also may be cored passages with open ends. The same is true of the grooves J–1, J–2, J–3 and J–4, and K–1, K–2, K–3 and K–4. In this respect the terms grooves, holes, ports, slots and the like are to be considered as synonymous.

Figures 16, 17, 18, 19, 20:
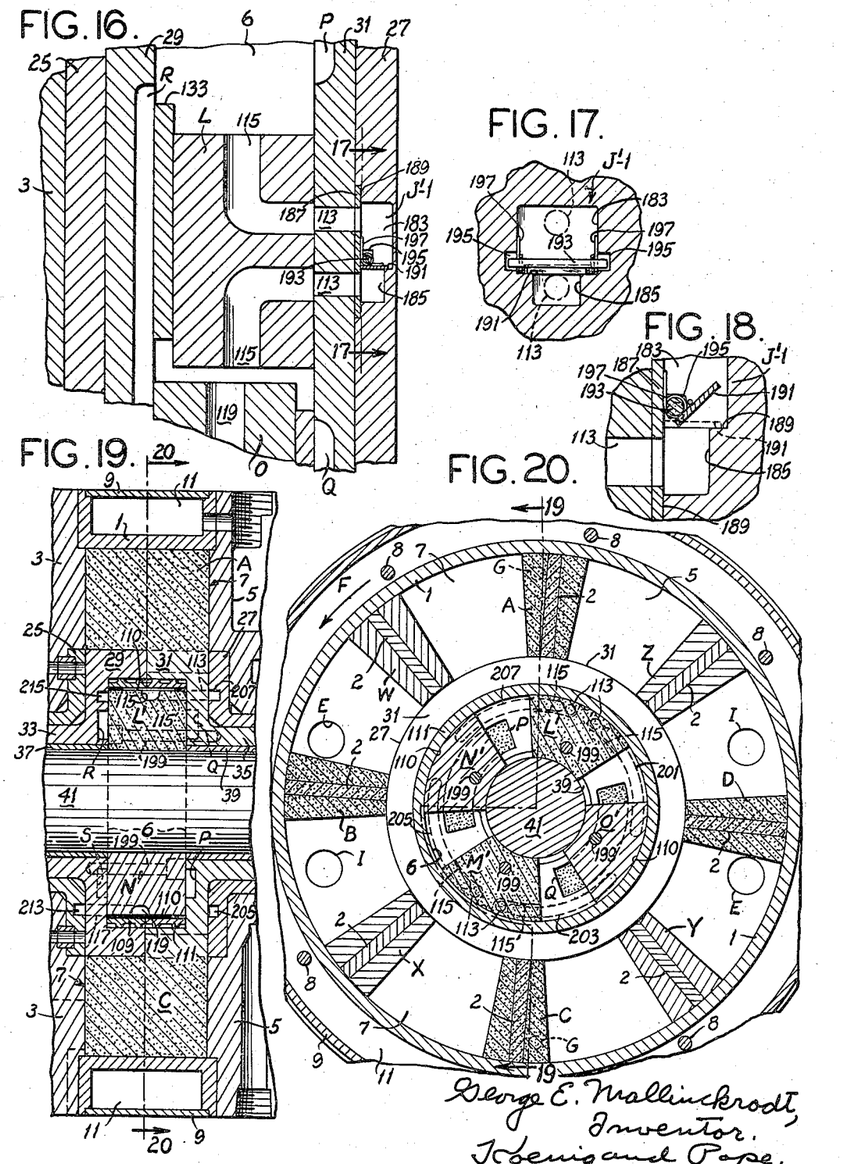
Fig. 16 is an enlarged section similar to Fig. 4 but showing a variation.
Fig. 17 is a section taken on line 17—17 of Fig. 16.
Fig. 18 is a fragmentary enlarged portion of Fig. 16, showing an alternative position of parts of said variation.
Fig. 19 is a fragmentary view showing parts of Fig. 1 and illustrating certain modifications, being taken on line 19—19 of Fig. 20.
Fig. 20 is a sectional view similar to Fig. 2 showing said modifications, being taken on line 20—20 of Fig. 19.

In Figs. 16–18 is shown a modification relating to insertion of valves into the grooves J–1 to J–4 and K–1 to K–4. In these Figs. 16–18, like numerals designate like parts, referring to Figs. 1–15. In certain designs there may be a tendency at certain low speeds for a control piston such as O to lag as maximum gas compression is approached, thereby tending to draw back fluid through a groove such as, say, J–1, thus to stall the engine. In order positively to prevent this occurrence, check valves may be placed in the grooves K–1 to K–4 and J–1 to J–4 in the flanges 25 and 27. In Fig. 16 a modified groove J–1 is shown for example, being indexed J′–1, which is representative of the modifications in all of the grooves J–1 to J–4 and K–1 to K–4. Each such modified groove, as illustrated by the groove J′–1, is composed of a large pocket 183, communicating with a smaller pocket 185, both being covered by a plate 187 on a surrounding shelf 189. The openings 113 extend through this plate. One of the openings 113 communicates with pocket 183 and the other with pocket 185. A valve plate is shown at 191 which is attached to a pintle 193. The ends of the pintle are movably carried in enlarged recesses 195 under the plate 187. Springs 197, attached to the pintle 193 and reacting from the plate 187, bias the valve plate 191 into a normally closed position such as shown in Figs. 16 and 17. In such position, any return flow of fluid from the front to rear of a piston such as L in response to a lagging piston such as O is prevented. However, flow under pressure from the rear to the front of the piston such as L upon relative advance of piston O is not substantially interfered with, as illustrated by the open position of the valve in Fig. 18. This alternative arrangement assures stability of operation under a greater range of dynamic conditions.

Another alternative form of the invention is shown in Figs. 19–26, in which like numerals designate like parts in view of those shown in Figs. 1–15. The purpose of this alternative form is to increase the reliability of fluid transfer through alternative grooves in the members 25 and 27 substituted for the grooves J–1 to J–4 and K–1 to K–4. These substituted grooves to be described below may be employed with or without the sliding plates 133. For simplification in the drawings and the description below relating to this alternative form of the invention, the plates 133 will be omitted and no reference will be made to the fluid supply and circulating porting, such as shown more particularly in Figs. 14 and 15, nor to the sealing means shown in Fig. 12.

Referring to Fig. 19, it will be seen that in this form of the invention the same rotors 29 and 31 surround shaft 41 to form a cavity 6, surrounded by the liner rings 109, 111. On the rotors 29 and 31 in the cavity 6 are the sector-shaped slots P, Q, R and S. The rotors 29 and 31 are located between the stationary flanges 25 and 27, located within the cylinder heads 3 and 5 at opposite ends of the stationary ring 1, the latter being surrounded by the jacket 9 which forms the water-cooling space 11. This provides the annular cylinder 7, wherein are located power pistons A, B, C, D (attached to the rotor 31) and W, X, Y, Z (attached to the rotor 29). Sector-shaped control pistons L′ and M′ are attached at 180° intervals to the rotor 31, carrying pistons A, B, C, D. Sector-shaped control pistons N′ and O′ are attached at 180° intervals to the rotor 29, carrying pistons W, X, Y, Z. Thus pistons L′, M′, N′, O′ are interdigitated in the cavity 6 and are counterparts of the pistons L, M, N, O, shown in Figs. 1–15, but omitting the sliding plates 143 (Fig. 20). Thus, as shown in Fig. 19, each piston L′, M′, N′, O′ extends from one inner end wall to the other inner end wall of the cavity 6. Holding bolts are illustrated at 199 in Figs. 19 and 20. It will be understood that the spaces between pistons L′, M′, N′, O′ are infilled with a suitable hydraulic fluid in the manner above described in connection with Figs. 14 and 15 but description of which is omitted from the present detailed description relating to Figs. 19–26.

Ports are used in pistons L′, M′, N′, O′ which are the same as those already described in connection with pistons L, M, N, O of Figs. 1–15. The same lettering is therefore used to represent these ports. Thus in pistons L′ and M′ are located ports 115, terminating in openings 113 of the rotor 31 to which the pistons L′ and M′ are attached. This appears on an enlarged scale in Figs. 22 and 25, as well as on a smaller scale in Figs. 19, 20, 21, 23, 24 and 26. Likewise, pistons N′ and O′ are provided with ports 119, terminating in openings 117 of the rotor 29 to which the pistons N′ and O′ are attached. These appear in Figs. 21–26.

In the stationary liner flange 27 are located long arcuate slots 201, 203, 205, 207 which take the place of the grooves J–1 to J–4 of Figs. 1–15. In the stationary liner flange 25 are located long arcuate slots 209, 211, 213, 215 which take the place of the grooves K–1 to K–4 of Fig. 1–15. These slots show in superimposed positions in Figs. 21, 23, 24 and 26. Slots 201, 203, 205 and 207 are spaced among themselves at 90° intervals; slots 209, 211, 213 and 215 are also spaced among themselves at 90° intervals; and the slots 201, 203, 205, 207 (as a group) are in a 90° phase relation to the slots 209, 211, 213, 215 (as a group).

For differentiation in description, slots 201, 203, 205 and 207 are shown in long-dash lines and slots 209, 211, 213 and 215 are shown in short-dot lines. For purposes of further differentiation between the groups, the short dot slots 209, 211, 213 and 215 are shown narrower than the long-dash slots 201, 203, 205, 207 in the diagrammatic Figs. 21, 23, 24 and 26.

Operation of this alternative form of the invention is as follows, wherein it will be understood that the liquid by-passing actions of the grooves P, Q, R, S in response to relative rotor movements are as described above, requiring no further comment. The timing of this by-passing action is broadly the same whether or not the sector plates 133 are employed, as will be clear by comparing the description of the machine without such plates (see my Patent No. 2,851,998, above mentioned).

Figure 21:
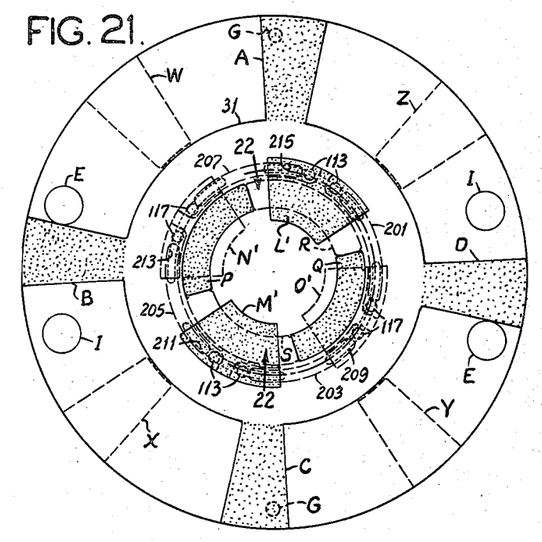
Fig. 21 is a skeleton view of parts corresponding to their neutral positions shown in Fig. 20.
Figure 22:
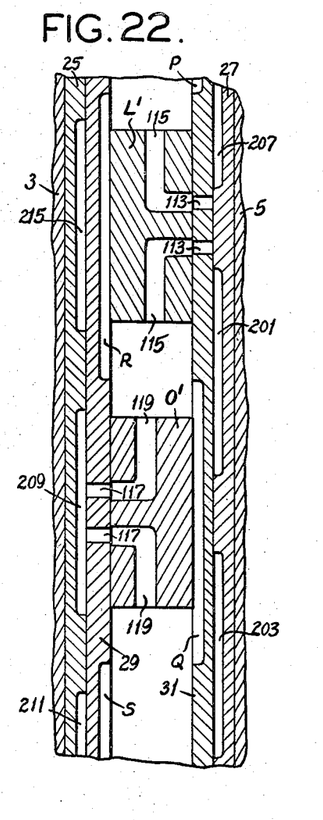
Fig. 22 is a developed section taken on line 22—22 of Fig. 21.
Figure 23:
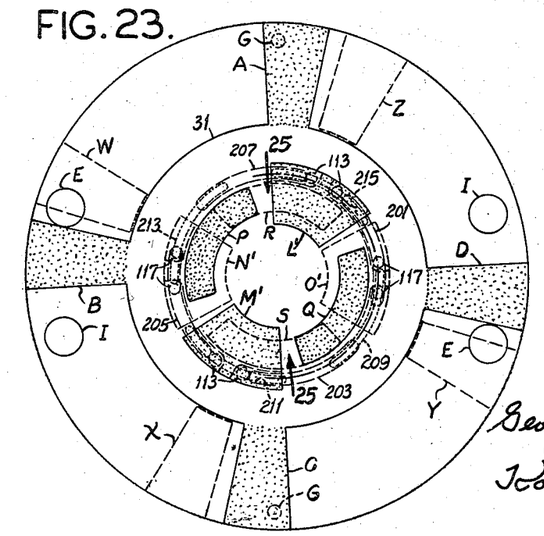
Fig. 23 is a view similar to Fig. 21, but showing progressive positions of parts.
Figure 24:
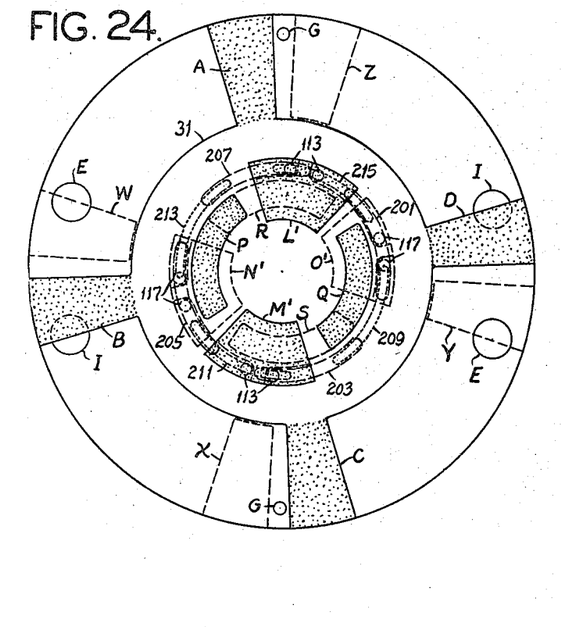
Fig. 24 is a view similar to Fig. 23 showing further progressive positions of parts.
Figure 25:
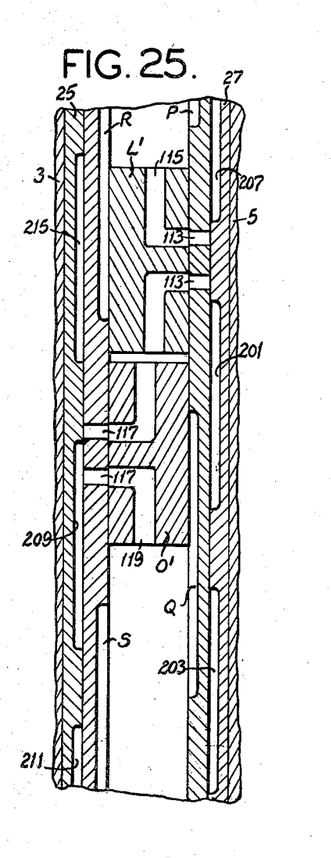
Fig. 25 is a developed section taken on line 25—25 of Fig. 23.
Figure 26:
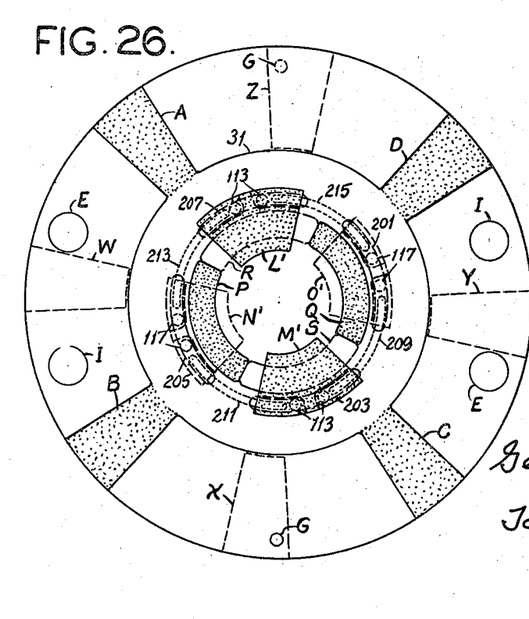
Fig. 26 is a view similar to Fig. 21 but showing interchanged positions of parts.

Starting with the parts as shown in Fig. 20 and 21 (the latter being diagrammatic) assume that the rotor 29 advances anticlockwise from the Fig. 21 to the Fig. 23 position, compression occurs between pistons Z and A and between pistons X and C, with rotor 31 and its pistons A, B, C, D, L' and M' being reverse-locked under reaction from the expansion occurring between pistons A and W and Y and C. During this action, the hydraulic control piston O' and N' advance upon the control piston L' and M' respectively, as hydraulic fluid is transferred from front to rear of the pistons N' and O', this occurring initially partly through the slots 209 and 213, respectively, and partly through the grooves P, Q, R and S (Fig. 22). By the time that the position of parts is reached shown in Fig. 23, at which time the grooves P, Q, R, S have been shut off by pistons L', M', N', O', the leading ports 117 of pistons N' and O' pass from the ends of the slots 209 and 213, respectively, thus having completely shut off the above-mentioned flow (Fig. 25). Therefore, hydraulic fluid is trapped between pistons O' and L' and between N' and M'. Thereafter, the rotors move together in the relatively fixed positions shown in Fig. 23 until the position of parts shown in Fig. 24 is reached and for a short time thereafter. At the point illustrated in Fig. 24, the spark plugs G are exposed to start ignition of the charges between pistons A and Z and X and C. The resulting expansion between these pistons starts at this time but does not build up to a substantial value until the two rotors (still moving together) advance from the Fig. 24 position to the Fig. 26 position so as to place the pistons W, X, Y, Z in reverse-locked positions, replacing the pistons A, B, C, D which formerly occupied such positions. By this time the expansive pressure has built up substantially between pistons A and Z and X and C, driving the pistons A and C anticlockwise with reaction against the reverse-locked pistons Z and X. At the same time, both ports 113 of each piston L' and M' have been placed in communication with the slots 203 and 207, respectively. Also, the pistons L', M', N', O' have been centered relative to the grooves P, Q, R, S. Thus hydraulic fluid may flow from front to rear to pistons L' and M', respectively, partly through grooves P, Q, R and S and partly through slots 203 and 207, respectively. Thus the system of parts A, B, C, D, L', M' on rotor 31 is driven anticlockwise by the expansive event. Thereafter the action as between the moving parts of rotor 31 with respect to the now stationary parts of rotor 29 is the same as that already described in connection with the action between the former moving parts of rotor 29 with respect to the formerly stationary parts of rotor 31, except, of course, that different groups of the slots 201, 203, 205, 207 and 209, 211, 213 and 215 are involved in assisting the transfer of hydraulic fluid from front to rear of the various pistons through grooves P, Q, R, S.

The advantage of this form of the invention over the control systems shown in Figs. 1–15 is that the slots 201, 203, 205, 207 and 209, 211, 213, 215, being long and differently positioned, function not only as positively operable cut-off means for ensuring accurate timing of the lock-up between rotors 29 and 31, but also function during the time that fluid is transferred between opposite sides of the control pistons L, M, N, O as auxiliaries to fluid transfer means.

The engine above described is of the so-called unidirectional free piston variety in the sense that the motion of the cooperating pistons relative to one another has no positive constraint through any mechanical linkage.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Hydraulic control means for gaseous collision processes occuring between cooperating relatively moving rotors of alternating piston engines; comprising circular pockets in the rotors, said pockets together forming a circular cavity adapted to be filled with hydraulic fluid, said pockets having alternately positioned rotatable hydraulic control pistons respectively attached therein and having oppositely positioned transfer ports facing the pistons, each transfer port adapted to transfer fluid from one side to the other of an adjacent piston upon relative movements between the rotors, and freely movable port control means associated with each piston adapted in accordance with relative rotor movements to control transfer of fluid through the associated transfer port.

2. Hydraulic control means for collision processes made according to claim 1, wherein each freely movable means is attached by a lost-motion captive connection with one piston.

3. Hydraulic control means according to claim 1, wherein alternate pistons extend axially and are attached in opposite ends of the pockets of the rotors, said pistons extending to points short of the distance between pockets so as to provide a space at each piston end, each of said port control means comprising a plate in one of the spaces between a piston and a pocket, and means captively holding each plate of its respective piston by means of a lost-motion connection.

4. Hydraulic control means for gaseous collision processes occurring between axially abutting relatively moving rotors of alternating piston engines; comprising circular pockets in the abutted portions of the rotors, said pockets together forming a circular cavity adapted to be filled with hydraulic fluid, said pockets having alternately positioned axially extending hydraulic control pistons respectively attached therein and having alternately positioned transfer ports facing the pistons, said pockets being spaced from the pistons, each transfer port adapted to transfer fluid from one side to the other of an adjacent piston upon relative rotary movements between rotors, and freely movable means slidably associated with each piston in the space between it and the respective spaced transfer port adapted in response to relative rotor movements to control transfer of fluid through the associated transfer ports.

5. Hydraulic control means for collision processes made according to claim 4, wherein each freely movable means is attached by a lost-motion captive connection with one piston.

6. Hydraulic control means for gaseous collision processes occurring between axially abutting relatively moving rotors of alternating piston engines; comprising circular pockets in the abutted portions of the rotors, said pockets together forming a circular cavity adapted to be filled with hydraulic fluid, said pockets having alternately positioned sector-shaped axially-extending hydraulic control pistons respectively attached therein and having alternately positioned transfer ports facing the pistons, said pockets being spaced from the pistons, each transfer port adapted to transfer fluid from one side to the other of an adjacent piston upon relative rotary movements between the rotors, and freely movable sector-shaped plate means captively held in association with each piston in the space between it and the respective transfer port adapted in response to relative rotor movements to move relative to the piston to control transfer of fluid through the associated transfer port.

7. An alternating piston engine comprising rotors forming a hydraulic control cavity containing oppositely facing relatively movable walls, one of which walls carries a piston and the other of which contains a fluid transfer pocket alternately movable with respect to a piston in accordance with relative wall movements and adapted to transfer fluid from one side to the other of the piston, said piston having one part connected to its respective rotor providing space between the piston and the opposite rotor, and another slidable cutoff part located in said space and cooperating with said pocket to effect variable cutoff of fluid transferred through the pocket, said slidable member having a lost-motion connection with the other part of the piston.

8. An alternating piston engine made according to claim 7, including differential friction means establishing a coefficient of friction between said cutoff means and the face of the rotor containing the pocket which coefficient is greater than the friction between the piston and the cutoff means.

9. An alternating piston engine made according to claim 8, wherein said differential friction means is constituted by a friction member slidably carried on the piston and spring means biasing said friction member toward said cutoff means.

10. An alternating piston engine made according to claim 9, wherein said slidable friction member has a face contacting the cutoff means, which face is composed of material different from that of the face of the rotor with which the cutoff means engages.

11. Sealing means for use between the outside surfaces of rotary pistons and the inside surfaces of annular cylinders in which said pistons rotate about an axis, comprising means forming an axial rounded groove on the outside of a piston to be sealed, a loose sealing cylinder lying axially in said groove, the diameter of said sealing cylinder being insufficient when resting at the bottom of the groove to effect any substantial sealing contact of the sealing cylinder with the annular cylinder wall, the rounded form of the groove being adapted transversely to guide said axial cylinder out into substantial sealing engagement with said annular cylinder wall in response to any force on the sealing cylinder which is transverse to the groove.

12. Sealing means made according to claim 11, wherein the groove is of circular cross section having a depth which is no less than the diameter of said sealing cylinder.

13. Sealing means made according to claim 11, wherein the groove is of circular cross section centered substantially on one of said inside surfaces and being of a radius larger than the diameter of said sealing cylinder.

14. Sealing means for use between the outside surfaces of rotary metal pistons and the inside surfaces of annular metal cylinders in which said pistons rotate about an axis, comprising means forming an axial rounded groove on the outside of a piston to be sealed, a rolling sealing cylinder of nylon or like nonmetallic sealing material lying axially in said groove, the diameter of said nonmetallic cylinder being insufficient when resting at the bottom of the groove substantially to contact the annular cylinder wall, the rounded form of the groove being adapted transversely to guide said nonmetallic cylinder into substantially sealing engagement with said annular cylinder wall.

15. Rotary apparatus comprising an assembly of a stationary support for an annular cylinder and at least two cooperating rotary systems having interdigitated power pistons in said cylinder, said rotary systems also including interdigitated control pistons in a fluid medium located in a cavity formed by the rotary systems, means for introducing a fluid medium under pressure into said cavity, fluid outlet means from the cavity, port means in the stationary support adapted for intermittent registry with said fluid outlet means as said systems rotate, whereby sludge, foam and the like may be intermittently removed from the cavity at timed intervals.

16. Rotary apparatus made according to claim 15, including check valve means in the inlet means permitting inward fluid flow but checking outward fluid flow except through said fluid outlet means.

17. Rotary apparatus comprising an assembly of a stationary support for an annular cylinder and at least two cooperating rotary systems having interdigitated power pistons in said cylinder, said rotary systems also including interdigitated control pistons in a fluid medium located in a cavity formed by the rotary systems, means for introducing a fluid medium under pressure into said cavity, fluid outlet means from the cavity in each rotary system, port means in the stationary support adapted to be registered temporarily with said fluid outlet means as said systems rotate, whereby sludge, foam and the like may be removed intermittently at suitable intervals from the cavity.

18. Rotary apparatus comprising an assembly of a stationary support for an annular cylinder and two cooperating rotary systems having interdigitated power pistons in said cylinder, said rotary systems also including interdigitated control pistons in a fluid medium located in a cavity formed by the rotary systems, means for introducing a fluid medium under pressure through both rotary systems into said cavity, fluid outlet means through both rotary systems from the cavity in each rotary system, port means in the stationary support adapted to be registered temporarily with said fluid outlet means as said systems rotate, whereby sludge, foam and the like may be removed intermittently at suitable intervals from the cavity.

19. Rotary apparatus comprising an assembly of a stationary support for an annular cylinder and at least two cooperating rotary systems having interdigitated power pistons in said cylinder, wherein alternately each system advances upon the other to effect a gas-buffered collision event between said power pistons, said rotary systems also including interdigitated control pistons in a liquid medium located in a cavity formed by the rotary systems, fluid porting means arranged between the stationary support, the rotary systems and the control pistons, adapted upon movements between the rotary systems relative to each other and the support, first to produce a liquid-buffered collision event between the control pistons during a gas-buffered collision event between the power pistons, whereby the latter event is assisted by the former event in partially transferring momentum from one rotary system to the other, second to close whereby the rotary systems move together in a substantially inelastic relationship without substantial transfer of momentum between them, and third to reopen and release one rotary system from the other during an expansion event, means adapted to introduce liquid medium under pressure into said cavity, fluid outlet means from the cavity in each rotary system, and port means in the stationary support adapted to be registered temporarily with said fluid outlet means as said systems rotate, the arrangement of said fluid outlet and port means being such that outlet registry is intermittently effected at times immediately preceding the respective intervals during which the rotary systems move together in said substantially inelastic relationship.

20. Rotary apparatus made according to claim 19, wherein said means for introducing liquid medium includes inlet check valve means.

21. Hydraulic control means for gaseous collision processes occurring between cooperating relatively moving rotors of alternating piston engines; comprising groups of stationary slot portions in opposite ends of a space formed by opposite stationary parts of the engine, relatively movable rotors having rotor members in said space abutted to form a cavity containing fluid, each rotor member having control pistons alternating with interdigitated control pistons of the other in said cavity, each rotor member having grooves cooperating with the control pistons of the other for liquid transfer across the pistons, said control pistons having transfer ports connecting across their front and rear faces and through said rotor members for connection with said slot portions during rotor movements, and check valve means in each of said slot portions permitting flow of fluid therethrough only in the direction of rotor movements.

22. Hydraulic control means for gaseous collision processes occurring between cooperating relatively moving rotors of alternating piston engines; comprising groups of stationary arcuate slot portions in opposite ends of a spaced formed by opposite stationary parts of the engine frame, relatively movable rotors having rotor members in said space abutted to form a cavity containing fluid, each rotor member having control pistons alternating with interdigitated control pistons of the other in said cavity, each rotor member having arcuate grooves cooperating with the control pistons of the other for liquid transfer across the pistons, each control piston having a pair of spaced transfer ports connecting between its front and rear faces and through said rotor members for connection with stationary arcuate slot portions during rotor movements and for liquid transfer across the pistons, the angle subtended by each arcuate slot portion substantially exceeding the arc subtended by each pair of said spaced transfer ports through the rotors, whereby liquid transfer across a piston occurs initially through both an arcuate groove and a pair of transfer ports and thereafter only through the last-mentioned transfer ports until a complete cut-off of liquid transfer occurs.

No references cited.

UNITED STATES PATENT OFFICE
CERTIFICATE OF CORRECTION

Patent No. 2,882,872                                                             April 21, 1959

George E. Mallinckrodt

It is hereby certified that error appears in the printed specification of the above numbered patent requiring correction and that the said Letters Patent should read as corrected below.

Column 5, line 49, for "centray" read -- central --; column 11, line 14, for "also rue" read -- also true --; column 14, line 24, for "of its respective" read -- to its respective --.

Signed and sealed this 18th day of August 1959.

(SEAL)
Attest:

KARL H. AXLINE                                               ROBERT C. WATSON
Attesting Officer                                           Commissioner of Patents